US009849658B2

(12) United States Patent
Eyb et al.

(10) Patent No.: US 9,849,658 B2
(45) Date of Patent: Dec. 26, 2017

(54) SYSTEM AND METHOD FOR PRODUCING A ROTOR BLADE SPAR CAP

(71) Applicant: SENVION SE, Hamburg (DE)

(72) Inventors: Enno Eyb, Kiel (DE); Urs Bendel, Fockbek (DE); Lenz Simon Zeller, Felde (DE)

(73) Assignee: Senvion SE, Hamburg (DE)

( * ) Notice: Subject to any disclaimer, the term of this patent is extended or adjusted under 35 U.S.C. 154(b) by 70 days.

(21) Appl. No.: 14/692,684

(22) Filed: Apr. 21, 2015

(65) Prior Publication Data

US 2015/0224760 A1 Aug. 13, 2015

Related U.S. Application Data

(63) Continuation of application No. PCT/EP2013/003007, filed on Oct. 7, 2013.

(30) Foreign Application Priority Data

Oct. 22, 2012 (DE) .................. 10 2012 219 224

(51) Int. Cl.
*B32B 38/18* (2006.01)
*B29D 99/00* (2010.01)
(Continued)

(52) U.S. Cl.
CPC ...... *B32B 38/1808* (2013.01); *B29D 99/0028* (2013.01); *B32B 38/0004* (2013.01);
(Continued)

(58) Field of Classification Search
CPC ....... B29C 69/00; B29C 70/52; B29C 70/541; B29D 99/0025; B29D 99/0028;
(Continued)

(56) References Cited

U.S. PATENT DOCUMENTS 5,375,324 A 12/1994 Wallace et al.
2007/0140861 A1 6/2007 Wobben
(Continued)

FOREIGN PATENT DOCUMENTS

EP 2341239 A2 7/2011
EP 2433782 A1 3/2012
(Continued)

OTHER PUBLICATIONS

Written Opinion of the International Searching Authority for PCT/EP2013/003007.*
(Continued)

*Primary Examiner* — Ryan Ochylski
(74) *Attorney, Agent, or Firm* — Rankin, Hill & Clark LLP

(57) ABSTRACT

The invention relates to a system and to a method for producing a rotor-blade spar cap with pultruded rods made of a fiber-reinforced material. According to the invention, the system includes at least one retaining apparatus for rotatably mounting at least one rod-layer roll with a rolled-up layer of pultruded rods arranged one beside the other, and a laminating mold for receiving layers of pultruded rods. The system further includes at least one guiding apparatus and additionally at least one trimming apparatus. The guiding apparatus is designed to guide onto the laminating mold a layer of pultruded rods which has been unrolled from a rod-layer roll. And, the trimming apparatus, for trimming the layers of pultruded rods, has a sawing apparatus and/or a milling apparatus.

12 Claims, 2 Drawing Sheets

(51) Int. Cl.
*B32B 38/00* (2006.01)
*B29C 70/52* (2006.01)

(52) U.S. Cl.
CPC .......... *B29C 70/52* (2013.01); *B32B 2305/10* (2013.01); *B32B 2307/514* (2013.01); *Y02E 10/721* (2013.01)

(58) Field of Classification Search
CPC .......... B32B 2305/10; B32B 2307/514; B32B 38/0004; B32B 38/18
USPC .......................................................... 156/245
See application file for complete search history.

(56) References Cited

U.S. PATENT DOCUMENTS

| | | |
|---|---|---|
| 2008/0159871 A1 | 7/2008 | Bech |
| 2011/0243750 A1 | 10/2011 | Gruhn et al. |
| 2012/0027609 A1 | 2/2012 | Ogde et al. |
| 2012/0082554 A1 | 4/2012 | Baker et al. |

FOREIGN PATENT DOCUMENTS

| | | |
|---|---|---|
| GB | 2497578 A | 6/2013 |
| WO | 2006/049782 A2 | 5/2006 |
| WO | 2010/065928 A1 | 6/2010 |
| WO | 2010/129492 A2 | 11/2010 |
| WO | 2012/024377 A1 | 2/2012 |

OTHER PUBLICATIONS

Cairns, Douglas S., and Bundy, Bryan C., The Application of Pre-Cured Carbon Fiber/Epoxy Pultrusions as Reinforcement in Composite Wind Turbine Blades, 45th AIAA Aerospace Sciences Meeting and Exhibit, Jan. 8-11, 2007, Reno Nevada (9 pages).

International Search Report dated Jan. 15, 2014 in corresponding International Patent Application No. PCT/EP2013/003007.

* cited by examiner

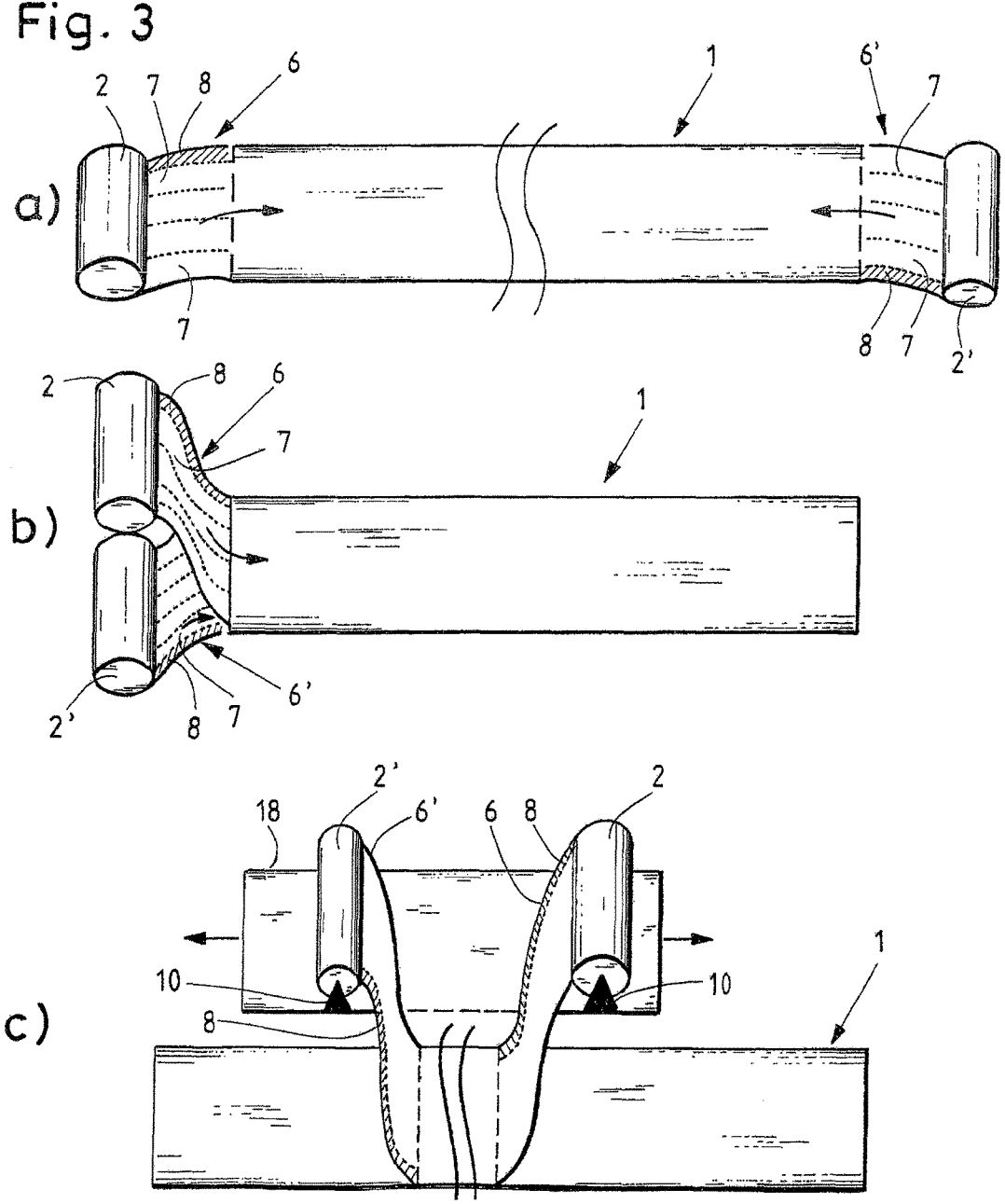

SYSTEM AND METHOD FOR PRODUCING A ROTOR BLADE SPAR CAP

CROSS-REFERENCE TO RELATED APPLICATION

This application is a continuation of PCT/EP2013/003007, filed Oct. 7, 2013, and claims priority to DE 10 2012 219 224.7, filed Oct. 22, 2012.

BACKGROUND OF INVENTION

Field of Invention

The invention relates to a system and to a method for producing a rotor-blade spar cap with pultruded rods made of a fiber-reinforced material.

Brief Description of Related Art

Rotor-blade spar caps generally comprise thick strands of parallel fibers, usually glass fibers or carbon fibers, which are embedded in a resin matrix. The rotor-blade spar caps pass through the rotor blades usually over a large part of the rotor-blade length from the rotor-blade tip to the rotor-blade root and serve to transmit to the rotor-blade root the forces which act on the rotor blade.

Rotor-blade spar caps are produced usually in a layered construction in which either dry fiber fabrics are laid one upon the other with parallel orientation and are then made into the rotor-blade spar cap by resin infusion; or prefabricated layers of fiber materials already embedded in resin, so-called prepregs, are laid one upon the other and are then connected to one another. Since rotor-blade spar caps are of a similar length to modern rotor blades, that is to say possibly over 40 m or 50 m in length, the fiber materials used are correspondingly long and large in volume.

The operation of curing the resin is an exothermic process; heat is therefore produced. The heat distributed over large volumes may result in the formation of waves in the fiber material, and therefore the latter no longer has ideal parallel orientation over the entire spar-cap length. This then impairs the tensile strength and therefore the structural compactness and the functional capability of the rotor-blade spar cap produced in this way.

US 2011/0243750 A1 discloses the use of pultruded rods made of fiber-reinforced material instead of dry glass-fiber fabrics or prepregs. Such pultruded rods consist of a fiber-reinforced material which is produced by pultrusion and in which the glass fibers or carbon fibers have parallel orientation and are already embedded in a resin matrix. The pultrusion also provides the fibers with ideal parallel orientation. The pultruded rods are laid tight against one another to give the construction of the rotor-blade spar cap. Subsequent joining of the rods to one another no longer results in the formation of waves. The disclosure of US 2011/0243750 A1 is hereby incorporated by reference in its entirety as if fully presented in this application.

US 2012/0027609 A1 also discloses a method for producing rotor-blade spar caps from pultruded rods, wherein a quasi-endless pultruded rod is rolled up on a roll and unrolled. In this method, each layer is built up from rods which are unrolled one after the other from the roll, and cut off from the quasi-endless rod, before the next layer is built up, in turn, in the same way. Following completion, the contour of the respective end of each layer is finished off.

Proceeding from this prior art, it is an object of the present invention to specify a system and a method which are intended for producing a rotor-blade spar cap with pultruded rods made of a fiber-reinforced material and which make it possible to construct a rotor-blade spar cap with pultruded rods quickly, reliably and flexibly.

BRIEF SUMMARY OF THE INVENTION

This object is achieved by a system which is intended for producing a rotor-blade spar cap with pultruded rods made of a fiber-reinforced material and is developed in that it comprises at least one retaining apparatus for rotatably mounting at least one rod-layer roll with a rolled-up layer of pultruded rods arranged one beside the other, also comprises a laminating mold for receiving layers of pultruded rods, further comprises at least one guiding apparatus and additionally comprises at least one trimming apparatus, wherein the guiding apparatus is designed to guide onto the laminating mold a layer of pultruded rods which has been unrolled from a rod-layer roll, wherein the trimming apparatus, for trimming the layers of pultruded rods, has a sawing apparatus and/or a milling apparatus.

In contrast to the known prior art, the spar cap is thus constructed in layers by the system according to the invention, wherein each layer is introduced into, and/or positioned on, a laminating mold in one operating step. The pultruded rods have already been rolled up in the form of a layer on the rod-layer rolls and are removed in the form of a layer. This means that it is no longer necessary for each individual rod to be unrolled, and applied to, and/or introduced into, the mold, in a dedicated step. This method requires only a fraction of the time per rod layer in comparison with the previously known method, in which each individual rod was unrolled.

This is made possible by the use of the guiding apparatus, which is designed for guiding the rod layer as a whole. The guiding apparatus ensures that the layer of pultruded rods remains together and does not split up into individual rods, and therefore this layer is introduced into, and/or applied to, the laminating mold as an entire single unit. The trimming apparatus performs the tasks of cutting to length, trimming and dimensioning the layer of pultruded rods even as said layer is being unwound. This means that the desired end contour for the respective layer can be generated as early as the cutting-to-length operation, and need not be finished off, with high outlay being required, in the end state. A finishing-off operation may, of course, also be provided according to the invention.

This guiding apparatus ensures that the material is introduced at the correct position relative to the mold surface. This refers, in particular, to the position in relation to the width of the laminating mold, in order to ensure for example defined offsetting of the individual layers in relation to one another or for it to be possible to lay the layers precisely one above the other "edge to edge". This also refers to the height above the laminating mold, since it is advantageous for the guiding unit to be kept always flush in relation to the surface of the uppermost layer since, for example in the case of a main spar cap, a large number of layers have to be laid one above the other and the height of the guiding unit thus has to be adjusted.

It is possible, within the context of the invention, for the layer of pultruded rods to be rolled up as such directly on the rod-layer roll or also, as an alternative, to be covered on one or both sides by a cover layer made of a flexible material, for example a braided fiber fabric, a felt material or a nonwoven material. Such a cover layer helps keep the rod layer together. It can also protect the rods of the rod layer against mechanical damage during the unrolling operation and passage through the guiding apparatus. Such a cover layer should be permeable to liquid resin material, so as to be able to become a constituent part of the spar-cap construction.

The retaining apparatus preferably has a drive apparatus and/or a braking apparatus for a rod-layer roll retained in the retaining apparatus and/or for at least one force-activated pressure-exerting roller, which presses onto the rolled-up rod layer, wherein in particular the at least one pressure-exerting roller has a soft surface. This measure improves the operation of unrolling the layer of pultruded rods from the rod-layer roll, since the pultruded rods are fairly stiff and tend to loosen on the rod-layer roll. The rolled-up rods act like a rolled-up spring of which the spring force presses in the outward direction. The pressure-exerting roller or the pressure-exerting rollers act against this. A pressure-exerting roller is arranged preferably wherever the layer of pultruded rods moves away tangentially from the rod-layer roll during the unwinding operation. So as not to damage the rods of the layer, the pressure-exerting roller preferably has, or the pressure-exerting rollers preferably have, a soft surface.

On account of the high level of rigidity inherent in the material, it is also possible for the rod material on the rod-layer rolls to be fixed by bands for transportation purposes. These bands prevent individual pultruded rods from rolling up and becoming detached from the roll, which would give rise to considerably more work during production since the rods would have to be repositioned or the entire roll would have to be discarded as waste. These bands, when the roll is for example fitted into the retaining apparatus, are replaced by the pressure-exerting roller.

Preferably at least one sensor is arranged in the guiding apparatus and/or on a pressure-exerting roller and/or on an arrangement which subjects a pressure-exerting roller to the action of force, wherein there is a signal-transmission channel from the at least one sensor to a control or regulating apparatus of the drive apparatus and/or braking apparatus, and the control or regulating apparatus is designed to control or to regulate the movement of a rod-layer roll in dependence on transmitted sensor signals. The sensor signals serve to provide automatic control for the operations of unwinding and, in particular, also of trimming and of introduction into, and/or positioning on, the laminating mold. This makes it possible for a desired spar-cap shape to be produced largely automatically. The movement of the rod-layer roll is preferably regulated or controlled such that the operation of rolling out the material between the roll and the guiding apparatus takes place in a force-free manner.

It is likewise preferable for the system to comprise a control apparatus for the guiding apparatus, which is designed to track the position of the guiding apparatus in respect of its vertical and/or horizontal position in relation to the laminating mold, in particular in dependence on the position of the surface of the uppermost layer of pultruded rods in the laminating mold. This measure also makes it possible for the operation of positioning the rods of each layer in or on the laminating mold to take place largely automatically.

For automatically setting down the layers of rods in order to produce the rotor-blade spar cap, it is also advantageous if the guiding apparatus has guiding rollers, between which runs the layer of pultruded rods, wherein there is in particular at least one contactless sensor and/or at least one running-wheel sensor for measuring a paid-out length of a layer of pultruded rods. The length of the hitherto unwound rods can be ascertained particularly precisely on the guide rollers, this, in turn, being used as information for the construction of the rotor-blade spar cap.

Preferably at least one guiding roller has a drive and/or a brake. This means that the guiding roller of the guiding apparatus is likewise designed to unwind the layer of pultruded rods in as careful and force-free a manner as possible, in particular in conjunction with the drive apparatus in the retaining apparatus, and thus to introduce said layer without deformation into the laminating mold. The material can thus be paid out quickly and smoothly into the laminating mold. This is important particularly for large rotor blades having a length of, for example, more than 50 m or, in particular, more than 65 m, since, here, an operation of paying out the material using physical force alone is extremely time-consuming and work-intensive and therefore expensive.

In order to insert the layer of pultruded rods into the guiding apparatus, the invention preferably provides for the layer to be clamped, at the end, between two bars, of which at least one has handles at each of its ends. The bars keep the layer of rods together and allow insertion into the guiding apparatus, possibly assisted by the drive of the retaining apparatus.

This trimming unit according to the invention is distinguished in that it has a sawing or milling unit, which severs the material such that a scarf joint is produced simultaneously in the thickness direction. The trimming apparatus is configured such that the material can be severed at any desired angle to the longitudinal axis of the material and the scarf-joint angle can also be selected freely.

In order that the layers of pultruded rods are produced with end contours which approximate spar-cap contours, the sawing apparatus and/or the milling apparatus are/is designed preferably to generate a scarf joint in the thickness direction and/or to execute a severing action at an angle to the longitudinal axis of the layer of the pultruded rods, in particular at a scarf-joint angle between 2° and 10° to the surface of the layer and/or at an angle of 90° to ±45° to the longitudinal axis of the layer. The trimming apparatus can sever the material such that a scarf joint is produced simultaneously in the thickness direction. The trimming apparatus is configured such that the material can be severed at virtually any desired angle to the longitudinal axis of the material and the scarf-joint angle can also be selected freely. An angle of 90° to the longitudinal axis of the layer means that the cut edge runs precisely transversely to the longitudinal axis, although it is also possible to set some other angle to the longitudinal axis.

The trimming apparatus preferably has a dust-tight enclosure and, in particular, a connection for a dust-extraction apparatus. This embodiment of the trimming unit is particularly advantageous since the dust cannot penetrate into the region of the laminating mold and thus contaminate the semifinished product which has already been set down, which would result in the achievable strength levels in the definitively laminated component being impaired.

The retaining apparatus, the guiding apparatus and/or the trimming apparatus are/is installed preferably in a stationary manner or on a supporting apparatus which can be moved essentially parallel to the surface of the laminating mold. The stationary arrangement has the advantage of stable and reproducible mounting. Mounting on a movable supporting apparatus has the advantage that the layer of pultruded rods which is unrolled last does not have to be pushed over the layers which have already been set down beforehand; rather, it is laid upon the same and unrolled. This means that there is no longer any friction between the surfaces, with the risk of the already set-down structure of layers of pultruded rods of the rotor-blade spar cap being disrupted.

Particularly stable layering of the layers of pultruded rods is achieved if the rods of the individual layers, rather than being arranged directly one upon the other, are offset somewhat in relation to one another. In this case, as in a brick wall, the joining locations, rather than forming continuous lines, which form potential structural weak points, are in meandering form, which allows reliable joining. It is thus preferably the case that each layer comprises at least one side rod of reduced width, and therefore, despite the offsetting, the width of the rotor-blade spar cap is constant over the entire thickness.

In the system, it is preferably provided, for this purpose, that, in order to set down alternating sequences of layers with offset rods in the individual layers, there are two retaining apparatuses provided for two rod-layer rolls, wherein the retaining apparatuses are arranged both at one end of the laminating mold or at opposite ends of the laminating mold or on the movable supporting apparatus. It is preferably the case here that, in order to produce the rotor-blade spar cap, two rod-layer rolls each with a peripheral rod of smaller width than the rest of the rods of the layer are arranged in the retaining apparatuses such that the peripheral rods of smaller width are arranged on different sides, as seen in relation to the laminating mold.

The alternating sequence of layers means that the respective rod of smaller width is arranged in alternating fashion on the left-hand edge or the right-hand edge to give the desired offset formation. For this purpose, it may be necessary either to arrange the layer appropriately in each case on the rod-layer rolls or, in the case of identically arranged layers on the rod-layer rolls, to turn round in each case one rod-layer roll on the respective retaining apparatus.

The retaining apparatuses for the two rod-layer rolls may also be arranged at opposite ends of the rotor-blade spar cap or of the laminating mold. Since said rod-layer rolls are unrolled in opposite directions to one another, this turning operation or re-orientation alone results in the narrower rods being arranged on the opposite sides.

The object on which the invention is based is also achieved by a method which is intended for producing a rotor-blade spar cap with pultruded rods made of a fiber-reinforced material and is developed in that a sequence of layers with pultruded rods made of a fiber-reinforced material arranged one beside the other is set down one above the other in a laminating mold, in particular using an above-described system according to the invention, wherein the layers are unrolled in alternating fashion from two rod-layer rolls each having, along one periphery, a rod of smaller width than the rest of the rods of the layer, wherein the peripheral rods of smaller width are arranged on different sides, as seen in relation to the laminating mold.

For this purpose, it is preferable for the rod-layer rolls to be displaced over the laminating mold together on a movable supporting apparatus, wherein, in the case of a movement in one direction, a layer is unrolled from one rod-layer roll and, in the case of a movement in the opposite direction, a layer is unrolled from the other rod-layer roll.

As an alternative, it is preferable for the layers to be unrolled from retaining apparatuses which are installed in a stationary manner at one end, or at opposite ends, of the laminating mold.

In order to ensure that the rotor-blade spar cap is produced in as positionally precise a manner as possible, the operation of rolling out the material between the rod-layer roll and a guiding apparatus takes place preferably in a force-free manner. The force-free rolling-out operation ensures that the rods do not alter in structure during the rolling-out operation, and therefore they maintain the desired orientation for the rotor-blade spar cap.

The adjustment in positioning takes place, in a particularly advantageous embodiment, automatically, in that the position of the surface of the uppermost layer is determined in relation to a reference point and the guiding apparatus is tracked correspondingly by a control and/or regulating apparatus.

A further advantageous embodiment of the method according to the invention resides in that the length of the paid-out material is measured in the guiding apparatus, in particular via the rotation of the rollers or in contactless fashion by optical sensors or by an additional running wheel and is compared with a laminate plan which is stored in a control apparatus and defines the length of each material layer which is to be paid out. This property means that there is no need for complex measuring of the length of each layer; rather, the material can be paid out quickly to the envisaged length and then cut to length.

The features, properties and advantages mentioned in respect of the system according to the invention and of the method according to the invention also apply to the respectively other subject matter of the invention, since they relate to one another.

Further features of the invention are evident from the description of embodiments according to the invention together with the claims and the accompanying drawings. Embodiments according to the invention can implement individual features or a combination of a number of features.

BRIEF DESCRIPTION OF THE DRAWINGS

The invention will be described hereinbelow, without any restriction to the general concept of the invention, by way of exemplary embodiments and with reference to the drawings, wherein, in respect of all the details according to the invention which are not explained specifically in the text, reference is made expressly to the drawings, in which:

FIG. 2 shows a schematic illustration of the layer arrangement of a rotor-blade spar cap, and FIGS. 3a), b) and c) show schematic illustrations of three different alternatives for positioning layers of pultruded rods on a laminating mold.

In the drawings, in each case like or similar elements and/or parts are provided with the same reference signs, and there is therefore no need for said elements and/or parts to be introduced anew each time they occur.

DETAILED DESCRIPTION OF THE INVENTION

Figure 1:
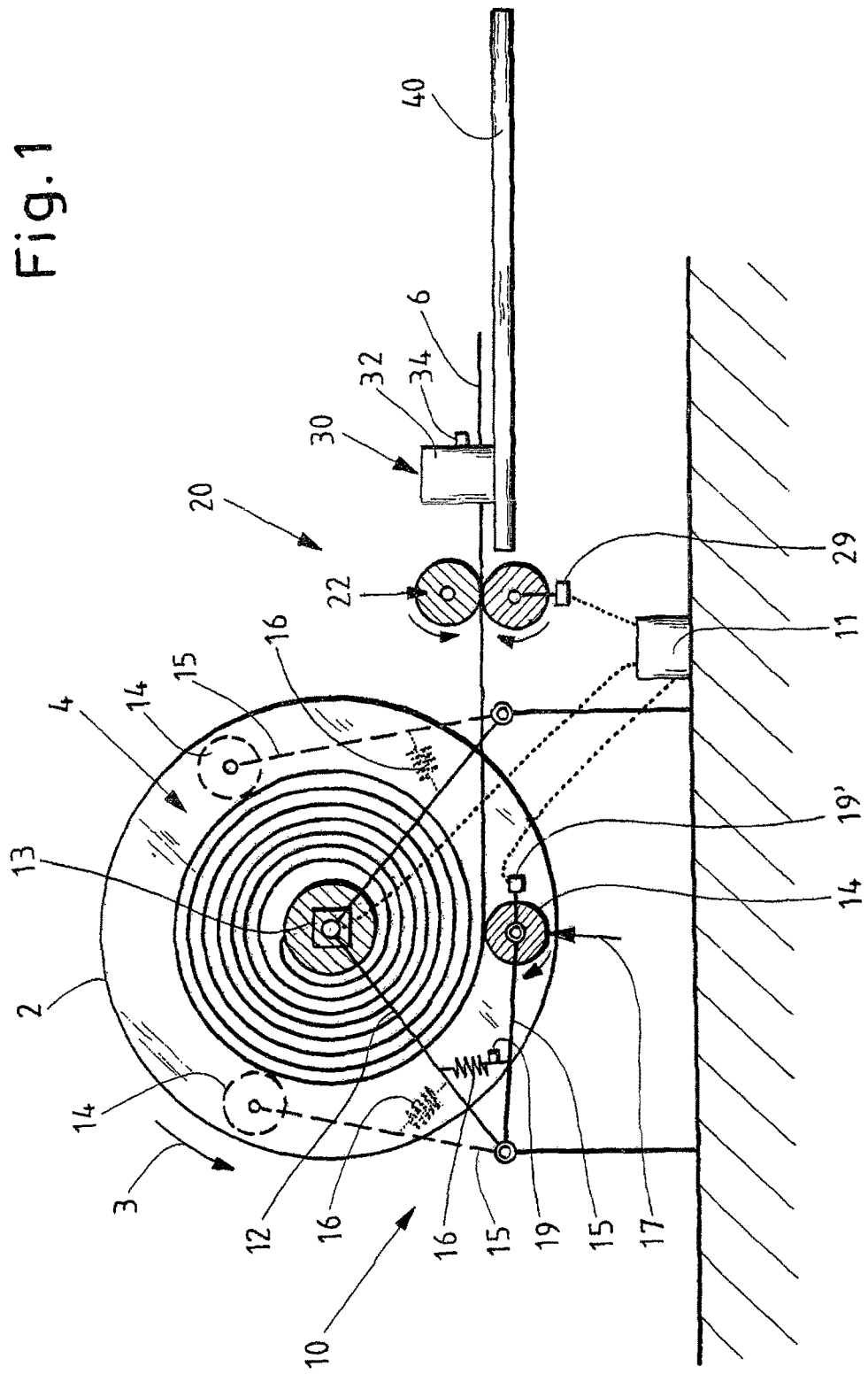
FIG. 1 shows a schematic illustration from the side of a system according to the invention.

FIG. 1 illustrates, schematically, a system for producing a rotor-blade spar cap 1 from layers 6 of pultruded rods. The layers 6 of pultruded rods are provided on rod-layer rolls 2, on which the rod layers 4 are rolled up, said rod layers 4 then being unrolled at a later stage to form rod layers 6. The rod-layer roll 2 rests in a rotatable manner on a retaining apparatus 10, which has a framework 12 for retaining the rod-layer roll 2. The framework 12 also has arranged on it a drive and braking apparatus 13, by means of which the rod-layer roll 2 can be rotated, for example, in the unrolling direction 3. The retaining apparatus 10 has at least one pressure-exerting roller 14, which has a soft surface and is arranged on an articulated pressure-exerting arm 15, which is subjected to the action of force by means of a spring 16. The pressure-exerting roller 14 thus presses against the rolled-up rod layer 4 in the direction 17 of the spring force and therefore prevents said rod layer from unrolling under its own helical spring force. The pressure-exerting roller 14 here is arranged wherever the rolled-up rod layer 4 is unrolled. In order to stabilize the rolled-up rod layer 4 on the rod-layer roll 2, it is also possible for yet further pressure-exerting rollers 14, which may likewise be subjected to the action of a spring force, to be arranged around the circumference of the rod layer 4.

The rod layer 4 is unrolled and guided by a guiding apparatus 20 having two guiding rollers 22. Said guiding apparatus receives the rod layer 4 and directs it onward to a trimming apparatus 30, which may have milling and/or sawing apparatuses, in order to define the end edge of a rod layer 6. The rod layer 6 is unrolled further and moved into the desired position on a laminating mold 40 or introduced into the same.

There is a control apparatus 11 provided, which can receive signals, via signal channels (illustrated by dashed lines), which may be wired or wireless, from sensors 19, 19', 29, these informing the control apparatus 11 on the progression of the unrolling operation. Such sensors 19, 19', 29 may be, for example, sensors 19 which are arranged on a force-activation means, for example a spring, which acts on a pressure-exerting roller 14. A sensor 19' may also be arranged directly on a pressure-exerting roller 14. An alternative or additional sensor 29 can also observe the progression of the unrolling operation on a guiding roller 22. Such a sensor 29 may be a contactless sensor or, for example, also a turning wheel or running wheel.

The control apparatus 11 also has a control channel, wireless or wired, to the drive and braking apparatus 13 of the retaining apparatus 10. It is likewise possible for a driven guiding wheel 22 to be controlled in the same manner, and therefore a preprogrammed contour of the rotor-blade spar cap which is to be constructed can be set automatically. It is likewise possible for the height of the guiding rollers 22 or of the guiding apparatus 20 to be set so that the height reached can be constantly adapted during the operation of the rotor-blade spar cap being constructed from successive layers 6 of pultruded rods.

The trimming apparatus 30 is illustrated with a dust-tight enclosure 32 which also has, in addition, a connection 34 for the suction extraction of dust which occurs. The trimming operation is thus carried out in a largely dust-free manner.

FIG. 2 illustrates, schematically, the layered construction of a rotor-blade spar cap produced according to the invention. The cross section shows the laminating mold 40 at the bottom, three layers 6, 6' of pultruded rods 7, 8 being arranged thereon. Each layer 6, 6' has a multiplicity of normal-width pultruded rods 7 and in each case one side pultruded rod 8 of smaller width, in particular of half width. The latter rods are arranged on the right-hand side in the layers 6 in FIG. 2 and on the left-hand side in the layer 6' and therefore, in the case of the layers 6, 6' being of constant thickness, this gives rise to an offset arrangement of the pultruded rods 7, 8, this arrangement allowing the pultruded rods to be joined to one another in a largely defect-free manner and thus allowing a particularly stable structure.

FIGS. 3*a*), 3*b*) and 3*c*) show three alternatives for producing that structure of a rotor-blade spar cap 1 which is illustrated in FIG. 2. According to FIG. 3*a*), layers 6, 6' are set down in alternating fashion from two rod-layer rolls 2, 2', from the blade-root end and from the blade-tip end, in opposite directions as indicated by the arrows. The layers 6 here have the rods 8 of reduced width on one side, and the rod roll 2' has these rods on the opposite side, and this gives to the structure from FIG. 2.

FIG. 3*b*) gives an alternative, in which the two rod-layer rolls 2, 2' are arranged one above the other on one side, for example on the blade-root side, of the rotor-blade spar cap 1. Since the rod-layer roll 2' has been turned round once in relation to the rod-layer roll 2, the rods of reduced width 8, in both cases, are once again located on opposite sides. Layers 6, 6' are removed in alternating fashion from the upper rod-layer roll 2 and from the lower rod-layer roll 2', and set down, in order to produce the rotor-blade spar cap 1.

FIG. 3*c*) illustrates an alternative solution, in which the rod-layer rolls 2, 2', rather than being mounted in a stationary manner, as shown in FIGS. 3*a*) and 3*b*), are mounted on a movable supporting apparatus or a carriage 18. The two arrows to the left and right of the carriage 18 show that the carriage 18 is displaced successively in one direction and in the opposite direction, from one spar-cap end to the other and back again, that is to say from the blade tip to the root and back. In the case of the carriage 18 being displaced from left to right in the view of FIG. 3*c*), a layer 6 of pultruded rods 7, 8 is unrolled from the right-hand roll 2, whereas, in the opposite direction, that is to say with movement to the left, a layer 6' is unrolled from the rod-layer roll 2'. Since this likewise takes place in alternating fashion, the result, once again, is the offset structure of the pultruded rods 7, 8 which is shown in FIG. 2.

As an alternative to this, it is also possible for just one roll 2' to be installed on the carriage 18, but to be mounted such that it can be rotated about a vertical axis in a direction perpendicular to the surface of the laminating mold. It is thus possible for the roll 2 to be rotated such that it assumes the different orientations required in alternating fashion, depending on the direction in which the carriage 18 is being moved.

All the features mentioned, also the features which can be gathered from the drawings alone as well as individual features which are disclosed in combination with other features, are considered on their own, and in combination, to be essential to the invention. Embodiments according to the invention can be implemented by individual features or a combination of a number of features.

LIST OF REFERENCE NUMBERS APPEARING
IN THE DRAWING FIGURES

1 Rotor-blade spar cap
2, 2' Rod-layer roll
3 Unrolling direction
4 Rolled-up rod layer
6, 6' Rod layer
7 Normal-width rod
8 Rod of reduced width
10 Retaining apparatus
11 Control apparatus
12 Framework
13 Drive and braking apparatus
14 Pressure-exerting roller
15 Articulated pressure-exerting arm
16 Spring
17 Direction of force
18 Carriage
19, 19' Sensor
20 Guiding apparatus
22 Guiding rollers
29 Sensor 30 Trimming apparatus
32 Dust-tight enclosure
34 Dust-extraction connection
40 Laminating mold

What is claimed is:

1. A system for producing a rotor-blade spar cap with pultruded rods made of a fiber-reinforced material, the system comprising:
   at least one rod-layer roll with a rolled-up layer of pultruded rods arranged one beside the other;
   at least one retaining apparatus for rotatably mounting the at least one rod-layer roll with a rolled-up layer of pultruded rods arranged one beside the other;
   a laminating mold for receiving layers of pultruded rods;
   at least one guiding apparatus; and
   at least one trimming apparatus for trimming the layers of pultruded rods;
   wherein the guiding apparatus is configured to guide onto the laminating mold a layer of pultruded rods which has been unrolled from the at least one rod-layer roll rotatably mounted on the at least one retaining apparatus,
   wherein the at least one trimming apparatus is a sawing apparatus and/or a milling apparatus, and
   wherein, in order to set down alternating sequences of layers with offset rods in individual layers, there are two retaining apparatuses provided for two rod-layer rolls, wherein the two retaining apparatuses are arranged both at a same end of the laminating mold or at opposite ends of the laminating mold or on a movable supporting apparatus.

2. The system as claimed in claim 1, wherein the retaining apparatus has a drive apparatus and/or a braking apparatus for the rod-layer roll rotatably mounted in the retaining apparatus and/or at least one force-activated pressure-exerting roller, which presses onto the rolled-up rod layer.

3. The system as claimed in claim 2, wherein at least one sensor is arranged in the guiding apparatus and/or on the pressure-exerting roller and/or on an arrangement which subjects the pressure-exerting roller to force-activation, wherein there is a signal-transmission channel from the at least one sensor to a control or regulating apparatus of the drive apparatus and/or braking apparatus, and the control or regulating apparatus is configured to control or to regulate movement of the rod-layer roll in dependence on transmitted sensor signals.

4. The system as claimed in claim 2, wherein the at least one pressure-exerting roller has a soft surface.

5. The system as claimed in claim 1, wherein the system further comprises a control apparatus for the at least one guiding apparatus, which is configured to track the position of the at least one guiding apparatus in respect of its vertical and/or horizontal position in relation to the laminating mold in dependence on a position of a surface of an uppermost layer of pultruded rods in the laminating mold.

6. The system as claimed in claim 1, wherein the at least one guiding apparatus has guiding rollers, between which runs the layer of pultruded rods, and wherein there is at least one contactless sensor and/or at least one running-wheel sensor for measuring a paid-out length of a layer of pultruded rods.

7. The system as claimed in claim 6, wherein at least one of said guiding rollers has a drive and/or a brake.

8. The system as claimed in claim 1, wherein the sawing apparatus and/or the milling apparatus are/is designed to generate a scarf joint in a thickness direction and/or to execute a severing action at an angle to a longitudinal axis of the layer of the pultruded rods.

9. The system as claimed in claim 8, wherein the scarf joint is at a scarf-joint angle between 2° and 10° to a surface of the layer and/or at an angle of 90° to ±45° to the longitudinal axis of the layer.

10. The system as claimed in claim 1, wherein the trimming apparatus has a dust-tight enclosure and a connection for a dust-extraction apparatus.

11. The system as claimed in claim 1, wherein the retaining apparatus, the guiding apparatus and/or the trimming apparatus are/is installed in a stationary manner or on a supporting apparatus which can be moved essentially parallel to a surface of the laminating mold.

12. The system as claimed in claim 1, wherein, in order to produce the rotor-blade spar cap, two rod-layer rolls each with a peripheral rod of smaller width than remaining rods of the layer are arranged in the two retaining apparatuses such that peripheral rods of smaller width are arranged on different sides, as viewed in relation to the laminating mold.

* * * * *